May 10, 1966  R. A. ENGLISH  3,250,087
ABSORPTION REFRIGERATION
Filed May 20, 1964
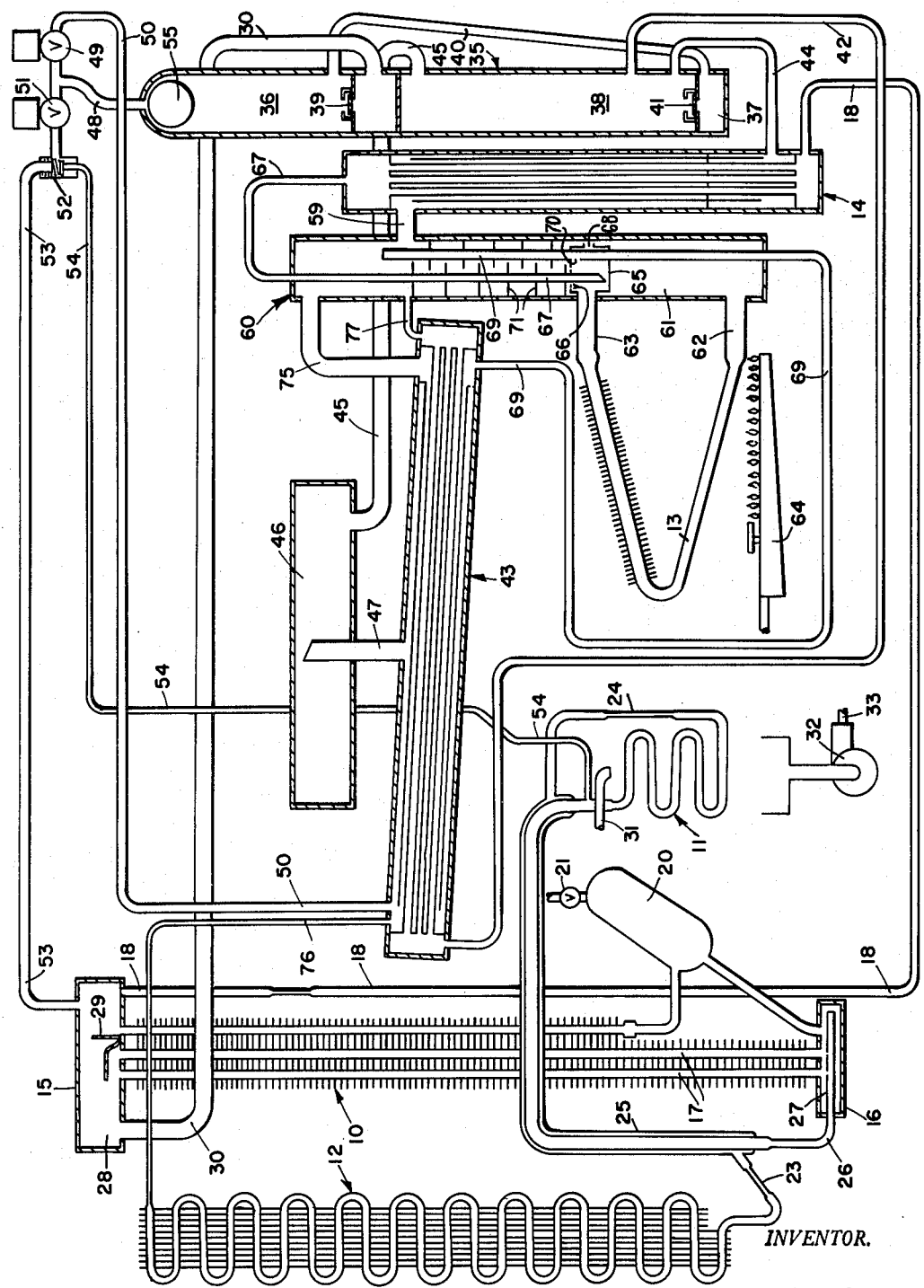
INVENTOR.
RICHARD A. ENGLISH.
BY Frank N. Decker Jr.
ATTORNEY.

United States Patent Office 3,250,087
Patented May 10, 1966

3,250,087
ABSORPTION REFRIGERATION
Richard A. English, Indianapolis, Ind., assignor to Carrier Corporation, Syracuse, N.Y., a corporation of Delaware
Filed May 20, 1964, Ser. No. 368,933
7 Claims. (Cl. 62—495)

This invention relates to absorption refrigeration, and more particularly, to absorption refrigeration machines of the type employing a separation chamber for separating a mixture of concentrated absorbent solution and vapor passed thereto from a generator.

Absorption refrigeration machines of the type herein described, generally employ a generator section, a condenser section, an absorber section, and an evaporator section, arranged to provide refrigeration. A liquid refrigerant is supplied to the evaporator section where it absorbs heat from a load to be cooled and is vaporized. The vaporized refrigerant is absorbed in an absorbent solution in the absorber section. The diluted or weak absorbent solution, having refrigerant vapor absorbed therein, is forwarded to the generator section where it is heated to drive off refrigerant vapor and to concentrate the absorbent. The concentrated absorbent is returned to the absorber section, and the vapor is passed to the condenser section where it is liquefied and returned to the evaporator section.

When the weak absorbent solution is heated in the generator, a mixture of concentrated absorbent solution and bubbles of vapor are passed to a separation chamber so that the vapor can be separated and forwarded to the condenser and the concentrated absorbent is either returned for further concentration in the generator or forwarded to the absorber. Such machines frequently use an analyzer section for further purifying the vapor passed thereto from the separation chamber for effecting a mass and heat transfer between the hot vapor and weak absorbent solution. From the analyzer section the vapor is generally forwarded to a rectifier section where additional absorbent is condensed from the vapor in order to further purify its refrigerant content. The condensate formed in the rectifier is withdrawn from the rectifier and forwarded to some appropriate location in the refrigeration machine.

Prior absorption refrigeration machines have employed separation chambers which are exterior of the analyzer scetion and which have often been expensive to fabricate and relatively large in size. In previous designs of absorption refrigeration equipment, it has been necessary to pay careful attention to the height of the rectifier with respect to the region to which condensate is drained in order to avoid the necessity of employing a condensate pump. Also, mechanical eliminators have frequently been required in prior art absorption refrigeration machines in order to prevent carry-over of absorbent solution into the analyzer from the separation chamber. These considerations have previously imposed limitations on the simplicity of the design and upon the location of components of such machines, which it is an object of this invention to overcome.

Accordingly, it is a principal object of this invention to provide an improved absorption refrigeration machine of the type employing a separation chamber.

It is a further object of this invention to provide an improved means for draining condensate from a rectifier in an absorption refrigeration machine.

It is still a further object of this invention to provide an improved separation chamber for separating strong absorbent solution from vapor formed in the generator section.

These and other objects of this invention, which will become apparent, are achieved in the illustrated preferred embodiment thereof by providing an analyzer having a column of absorbent solution therein through which separated vapor from the generator section is passed. A separation chamber is provided below the surface of absorbent solution in the analyzer and has a top portion with a plurality of apertures therein. These apertures form restricted passages for the passage of vapor in a predetermined desired pattern from the separation chamber into the analyzer. The apertures also serve to provide a pressure drop or difference in pressure between the interior of the separation chamber and the corresponding exterior pressure in the analyzer. Consequently, a vapor space exists adjacent the upper portion of the separation chamber which facilitates separation of absorbent solution from vapor. This vapor space eliminates the need for a mechanical eliminator by providing a region in which the vapor is slowed sufficiently to reduce entrainment of liquid particles.

In addition, a rectifier section is provided which may be disposed at least partially below the level of absorbent solution in the analyzer. A drain connects the rectifier from a region thereof below the level of solution in the analyzer and passes upwardly through the separation chamber and the column of liquid in the analyzer. An aperture is formed in the wall of the rectifier condensate passage at a region within the separation chamber wherein the vapor exists. The head of solution in the analyzer serves to provide a pressure in the separation chamber in combination with the restricted apertures previously described, sufficient to force the vapor into the rectifier condensate passage. The resulting mixture of condensate and vapor reduces the density of solution in the rectifier condensate drain line sufficiently so that the condensate may drain from the rectifier to a location above the level of the solution in the analyzer. It will be apparent that the location of the separation chamber, in order to achieve this purpose, is below that of the rectifier condensate drain. An additional advantage achieved by this arrangement is that the heat exchange between solution in the analyzer and that passing through the rectifier condensate drain assists in providing a vapor lift action in the condensate drain line, and a desirable mass and heat transfer takes place in the vapor lift portion of the condensate drain between the condensate and the vapor admitted to the drain line.

A suitable aperture is preferably formed in the separation chamber adjacent a region thereof at which liquid absorbent solution is contained to provide recirculation of absorbent solution to the generator for further concentration thereof. Preferably, also a strong solution line extends through the column of solution in the analyzer and terminates in the separation chamber so that strong solution withdrawn from the separation chamber is passed in heat exchange relation with the column of solution in the analyzer to effect a thermodynamic gain.

These and other objects of this invention will become more apparent by reference to the following specification and attached drawing wherein the figure is a schematic diagram, partly in cross section, of an absorption refrigeration machine embodying this invention.

Referring particularly to the drawing, there is shown an absorption refrigeration machine comprising an absorber section 10, an evaporator section 11, an air-cooled condenser section 12, a generator section 13, and a heat exchanger section 14. A refrigeration machine of the type herein described may desirably use ammonia as a refrigerant and water as an absorbent solution; other refrigerant and absorbent combinations may be used instead, if desired. As used herein, the term "strong solution" refers to an absorbent solution such as relatively pure water which is strong in absorbing power, and the expression "weak solution" refers to a dilute solution of absorbent having substantial refrigerant absorbed therein, which is weak in absorbing power.

Absorber section 10 comprises an upper header 15 and a lower header 16 connected by a plurality of heat exchange tubes 17. A strong solution line 18 forwards strong solution into upper header 15 from which it passes downwardly to lower header 16 through one or more recirculation lines 17. A suitable purge tank 20 with a purge valve 21 therein may be provided for the collection and purging of relatively non-condensible gases.

Liquid refrigerant is supplied from condenser 12 through a restriction 23, through one side of refrigerant heat exchanger 25, and a restriction 24 to evaporator coil 11. The refrigerant is vaporized in evaporator coil 11 and the vapor is returned through the other side of refrigerant heat exchanger 25 and refrigerant vapor line 26 to vapor distributor 27 in lower header 16 of absorber section 10. Water to be chilled, which comprises the load on the refrigeration machine, is supplied through entering chilled water line 31 and distributed over the coil in evaporator section 11 where it is chilled by giving up its heat to vaporize the refrigerant passing through the evaporator coil. This chilled water is then forwarded by chilled water pump 32 through leaving chilled water line 33 to cool a desired region, and is returned through entering chilled water line 31 for recooling.

The refrigerant vapor is injected into heat exchange tubes 17 of absorber section 10 where the refrigerant vapor is absorbed in the strong absorbent solution, thus rendering it weak solution when it reaches upper header 15. Weak solution in upper header 15 is segregated in a weak solution sump 28 formed by a baffle 29. The weak solution is forwarded to generator section 13 from absorber section 10 through weak solution line 30.

In order to pump weak solution from the low pressure absorber side of the system to the high pressure generator side of the system, a trap 35 is provided. Trap 35 comprises an upper chamber 36, a lower chamber 37 and an intermediate chamber 38. An upper check valve 39 is provided between weak solution line 30 and upper chamber 36. A solution line 40 is provided between upper chamber 36 and lower chamber 37. A lower check valve 41 is provided between lower chamber 37 and intermediate chamber 38. A line 42 connects intermediate chamber 38 to rectifier section 43, and another line 44 connects intermediate chamber 38 to heat exchanger 14. A third line 45 connects the upper portion of intermediate chamber 38 with an outlet tank 46 which is vented through line 47 to the vapor side of rectifier 43.

An equalizer line 48 connects upper chamber 36 to the high pressure vapor side of rectifier section 43 through high pressure valve 49 and high pressure vapor line 50. Equalizer line 48 is also connected through low pressure valve 51, blow-down check valve 52, and low pressure vapor line 53 to the low pressure vapor space in upper header 15 of absorber section 10. A line 54 extends from blow-down check valve 52 to refrigerant vapor line 26 at some convenient point. A float 55 may be provided in upper chamber 36 to minimize the surface area of solution exposed therein.

In order to forward weak solution from line 30 to the high pressure side of the system, high pressure valve 49 is closed and low pressure valve 51 is opened, thereby venting upper chamber 36 to upper header 15. Weak solution flows by gravity through line 30 into upper chamber 36 through check valve 39 and into lower chamber 37 through line 40. This solution cannot flow through check valve 41 because the valve is maintained closed by the pressure exerted on intermediate chamber 38 by high pressure vapor at the top of outlet tank 46, which is vented to the high pressure side of rectifier 43. After upper chamber 36 has been filled with absorbent solution, or preferably after a predetermined time interval for filling chamber 36 has passed, low pressure valve 51 is closed and high pressure valve 49 is opened. Opening of high pressure valve 49 vents upper chamber 36 to the high pressure side of the system through line 50 which is connected to the high pressure vapor side of rectifier 43. Consequently, solution in upper chamber 36 may then drain through line 40, lower chamber 37, and check valve 41, into intermediate chamber 38. This solution then drains by gravity from intermediate chamber 38 through line 42 to rectifier 43 and through line 44 to heat exchanger 14. The rectifier and heat exchanger constitute a substantially fixed restriction to the drainage of solution from chamber 38 and the excess solution drains through line 45 into outlet tank 46 which may actually comprise any suitable region or other suitable means for storage of the solution which does not immediately pass through either the heat exchanger or the rectifier.

After a period of time, high pressure valve 49 is closed and low pressure valve 51 is again opened. Upon opening of low pressure valve 51, the high pressure vapor remaining in the top of upper chamber 36 from the previous portion of the cycle, pushes upwardly on the underside of blow-down check valve 52, closing communication between equalizer line 48 and low pressure line 53, while at the same time exhausting the high pressure vapor into refrigerant vapor line 26. This high pressure vapor is absorbed in the absorber section along with refrigerant vapor from the evaporator formed in the evaporator coil. After the high pressure vapor is exhausted from upper chamber 36, blow-down check valve 52 closes to its normal position and vents upper chamber 36 to upper header 15 of absorber section 10 to begin the cycle again.

The side of heat exchanger 14 which carries weak solution from line 44 is connected by line 59 to analyzer section 60. Analyzer 60 comprises a vertically extending shell or column 61 for containing a substantial quantity of weak absorbent solution therein. An inlet 62 for passing absorbent solution to generator 13 is provided adjacent the lower end of the column of absorbent solution in analyzer 60. A gas burner 64 is provided to heat absorbent solution passed to generator 13, in order to concentrate the absorbent solution by vaporizing refrigerant therefrom. The mixture of vapor and concentrated absorbent formed in generator 13 is passed through outlet 63 to a separation chamber 65 disposed within the column of absorbent solution in analyzer 60.

Separation chamber 65 preferably comprises a generally closed chamber or vessel having a top portion provided with a number of perforations or apertures 66 and an overflow and equalizer hole 68 in the side thereof. Hole 68 in the side of separation chamber 65 permits solution to be recirculated through generator 62 in order to further concentrate it. Hole 68 also permits solution from analyzer 60 to drain into the separation chamber and through heat exchanger 14 upon shutdown of the machine. The height of hole 68 above the bottom of analyzer 60 and generator 61 assures a quantity of solution in the generator under all conditions so that dry start-up is prevented.

A strong solution discharge line 67 is provided to withdraw strong solution from separation chamber 65 and pass it to the strong solution side of heat exchanger 14 from which it passes through strong solution line 18 to absorber 10. The hot strong solution from the generator is thus passed in heat exchange relation with the relatively cooler weak solution passing to the generator through the analyzer as well as the weak solution side of heat exchanger 14 in order to economize the heating required in the generator.

The perforations or apertures 66 in the top of separation chamber 65 provide a restricted passage for vapor and are made of a size sufficient to maintain a small pressure difference between the solution within chamber 65 and that of the solution stored in analyzer 60. Consequently, a small vapor space exists above the level of solutions in separation chamber 65 which facilitates the separation of vapor and strong solution therein. The holes are made of a size to provide a restriction sufficient to form a vapor space large enough to slow down the vapor so that entrainment of liquid solution is minimized and mechanical eliminators are not needed. The apertures in the upper portion of separation chamber 65 are arranged so as to distribute vapor in a predetermined pattern evenly throughout the cross section of the analyzer. This hot vapor, which contains a substantial fraction of absorbent vapor as well as refrigerant vapor, is passed upwardly through the column of solution in the analyzer section. A plurality of horizontal baffles 71 may be provided to form a serpentine path for the passage of vapor bubbles, if desired. A mass and heat transfer relation takes place therebetween such that refrigerant is vaporized from the solution in the analyzer by contact with the relatively hot vapor, while at the same time the vaporized refrigerant is replaced by absorbent vapor which condenses into the absorbent solution. Consequently, the vapor reaching the upper portion of analyzer 60 is richer in refrigerant and poorer in absorbent than that which was injected into the analyzer from separation chamber 65.

The vapor, having an enriched refrigerant fraction, is forwarded from analyzer 60 through vapor line 75 to the vapor side of rectifier 43. The vapor is cooled in rectifier 43 by heat exchange with the relatively cool weak solution passing from line 42 through the weak solution side of the rectifier. Consequently, the vapor is further purified in the rectifier by condensing additional absorbent therefrom. Relatively pure refrigerant vapor emerging from rectifier 43 is forwarded through line 76 to condenser 12 where it is liquefied and passed to evaporator 11 as previously described. The absorbent, which is condensed in the vapor side of rectifier 43, is passed through rectifier condensate line 69 upwardly through the column of absorbent solution in analyzer 60.

As seen in the drawing, rectifier 43 is disposed at least partly below the level of solution in analyzer 60 and rectifier condensate line 69 terminates in the analyzer at a point above the level of solution therein. An aperture 70 is provided in line 69 above the level of solution in separation chamber 65 and below the top of the chamber to admit a controlled quantity of vapor into rectifier condensate line 69 under pressure. Aperture 70 allows the admission of a small quantity of vapor into rectifier condensate line 69 so as to reduce the density of the solution therein, thereby facilitating passage of rectifier condensate from the rectifier, through rectifier condensate line 69, into analyzer section 60 at a higher elevation than that from which the condensate was withdrawn from the rectifier, due to the vapor lift action in line 69.

Weak solution passed to the solution side of rectifier 43 is drained from the rectifier through line 77 into analyzer 60. Both line 77 and line 59 are connected to analyzer 60 below the level of solution therein and line 45 is connected to the outlet tank below the level of solution therein so as to provide a continuous liquid column from the solution in outlet tank 46 through rectifier 43 and through heat exchanger 14 to the solution stored in the analyzer. It will be observed that outlet tank 46 is disposed at least partially above the level of solution in analyzer 60 so that there exists a solution head between the solution level in the outlet tank and the solution level in the analyzer to pass absorbent solution from the outlet tank into the analyzer. Thus, solution is enabled to drain from outlet tank 46 into analyzer 60 and generator 13 during periods of time when trap 35 is admitting solution into chamber 36 as well as whenever the solution requirements of the generator section increase.

It is believed that the operation and function of this invention will be apparent from the foregoing description. The improved separation chamber described herein is more compact because it is disposed entirely within the analyzer column and does not require external piping and connections. This separation chamber is also simple and highly effective in separating the concentrated absorbent from the vapor formed in the generator, while at the same time it does not require eliminators or other mechanical separation means. The separation chamber can be easily designed to distribute the vapor formed in the generator in any predetermined desired pattern to obtain most efficient analyzing action.

It will also be apparent that the separation chamber cooperates with the rectifier condensate drain line to provide an effective simple condensate transfer mechanism without the necessity of requiring a pump. In addition, by running the condensate drain line and the strong solution line through the analyzer as described herein, advantageous heat transfer takes place between the solution in these lines and the solution in the analyzer column and improves the operation of the refrigeration machine. Also, a desirable mass and heat transfer takes place in the condensate drain line between the vapor admitted thereto and the condensate therein.

While there has been described a preferred embodiment of this invention, it will be appreciated that the invention may be otherwise embodied within the scope of the following claims.

I claim:
1. An absorption refrigeration machine comprising:
an absorber for absorbing refrigerant vapor into an absorbent solution;
a condenser for condensing refrigerant vapor;
an evaporator for evaporating refrigerant and cooling a refrigeration load;
a generator for concentrating the absorbent solution and producing vapor;
an analyzer for purifying refrigerant vapor passed to it from said generator, said analyzer being adapted to contain a column of absorbent solution therein; and
a separation chamber disposed within said analyzer below the level of solution therein, said separation chamber being provided with means to pass a mixture of vapor and concentrated absorbent solution from said generator into said separation chamber, said separation chamber including a top having an aperture therein disposed below the level of absorbent solution in said analyzer section for passing vapor from said separation chamber into said analyzer, said aperture being arranged to provide a vapor space in said separation chamber to facilitate the separation of vapor and absorbent solution therein.

2. An absorption refrigeration machine comprising:
an absorber for absorbing refrigerant vapor into an absorbent solution;
a condenser for condensing refrigerant vapor;
an evaporator for evaporating refrigerant and cooling a refrigeration load;
a generator for concentrating the absorbent solution and producing vapor;
an analyzer for purifying refrigerant vapor passed to it from said generator, said analyzer being adapted to contain a column of absorbent solution therein; and
a separation chamber, said separation chamber comprising a vessel disposed within said analyzer below the level of the column of absorbent solution therein, said vessel having a top portion with a plurality of openings therein of a size to provide a restricted vapor distributor for introducing vapor in a predetermined pattern into said analyzer section from said separation vessel, and for providing sufficient restriction to provide a vapor space above the level of absorbent solution in said separation chamber to thereby facilitate the separation of vapor and absorbent solution in said separation chamber.

3. An absorption refrigeration machine comprising:
an absorber for absorbing refrigerant vapor into an absorbent solution;

a condenser for condensing refrigerant vapor;
an evaporator for evaporating refrigerant and cooling a refrigeration load;
a generator for concentrating the absorbent solution and producing vapor;
an analyzer for purifying refrigerant vapor passed to it from said generator, said analyzer being adapted to contain a column of absorbent solution therein;
a separation chamber connected to receive and separate a mixture of vapor and concentrated absorbent solution from said generator, said separation chamber being submerged in the column of the absorbent solution in said analyzer, said separation chamber including an aperture in an upper region thereof to provide a restricted passage for vapor to pass from said separation chamber through the column of absorbent solution in said analyzer, said restricted passage maintaining the pressure of vapor in said separation chamber sufficiently high to maintain a vapor space in the upper portion of said separation chamber, passage means for passing strong absorbent solution from said separation chamber to said absorber, and said separation chamber including an aperture in a lower region thereof to provide a passage for the recirculation of absorbent solution through said generator.

4. An absorption refrigeration machine comprising:
an absorber for absorbing refrigerant vapor into an absorbent solution;
a condenser for condensing refrigerant vapor;
an evaporator for evaporating refrigerant and cooling a refrigeration load;
a generator for concentrating the absorbent solution and producing vapor;
an analyzer for purifying refrigerant vapor passed to it from said generator, said analyzer being adapted to contain a column of absorbent solution therein;
a separation chamber adapted to receive and separate a mixture of vapor and concentrated absorbent solution from said generator, said separation chamber being disposed below the level of the absorbent solution in said analyzer, said separation chamber including an aperture in an upper region thereof to provide a restricted passage for vapor to pass from said separation chamber through the column of absorbent solution in said analyzer, and a strong solution conduit extending from a lower region of said separation chamber upwardly through the column of solution in said analyzer to pass said strong solution in heat exchange relation with the relatively weak solution in said analyzer.

5. An absorption refrigeration machine comprising:
an absorber for absorbing refrigerant vapor into an absorbent solution;
a condenser for condensing refrigerant vapor;
an evaporator for evaporating refrigerant and cooling a refrigeration load;
a generator for concentrating the absorbent solution and producing vapor;
an analyzer for purifying refrigerant vapor passed to it from said generator, said analyzer being adapted to contain a column of absorbent solution therein;
a separation chamber adapted to receive and separate a mixture of vapor and concentrated absorbent solution from said generator, said separation chamber having restricted means to pass vapor from said separation chamber through the column of absorbent solution in said analyzer section, said restricted passage also serving to maintain a vapor region in said separation chamber to facilitate the separation of absorbent solution and vapor passed into said separation chamber;
a rectifier section for purifying refrigerant vapor passed thereto from said analyzer by condensing absorbent from said vapor; and
a rectifier condensate passage connecting said rectifier to said analyzer for passing condensate from said rectifier to said analyzer, said condensate passage terminating in said analyzer above the level of solution therein, and said machine including vapor passage means connecting said rectifier condensate passage and said separation chamber for passing vapor from said separation chamber into said rectifier condensate passage.

6. An absorption refrigeration machine comprising:
an absorber for absorbing refrigerant vapor into an absorbent solution;
a condenser for condensing refrigerant vapor;
an evaporator for evaporating refrigerant and cooling a refrigeration load;
a generator for concentrating the absorbent solution and producing vapor;
an analyzer for purifying refrigerant vapor passed to it from said generator, said analyzer being adapted to contain a column of absorbent solution therein;
a separation chamber adapted to receive and separate a mixture of vapor and concentrated absorbent solution from said generator, said separation chamber having restricted passage means to pass vapor from said separation chamber through the column of absorbent solution in said analyzer section, said restricted means also serving to maintain a vapor region in said separation chamber to facilitate the separation of absorbent solution and vapor passed into said separation chamber;
a rectifier section for purifying refrigerant vapor passed thereto from said analyzer by condensing absorbent from said vapor, said rectifier being disposed at least partly below the level of solution in said analyzer; and
a rectifier condensate passage for passing absorbent solution condensed in said rectifier to said analyzer, said rectifier condensate passage extending from said rectifier upwardly through said separation chamber and said analyzer and terminating above the level of both the condensate in said rectifier and the level of solution in said analyzer, and vapor passage means extending between the vapor region in said separation chamber and said rectifier condensate passage for admitting vapor under pressure into said condensate passage to facilitate transfer of the condensate to the level of the termination of said rectifier condensate passage.

7. An absorption refrigeration machine comprising:
an absorber for absorbing refrigerant vapor into an absorbent solution;
a condenser for condensing refrigerant vapor;
an evaporator for evaporating refrigerant and cooling a refrigeration load;
a generator for concentrating the absorbent solution and producing vapor;
an analyzer for purifying refrigerant vapor passed to it from said generator, said analyzer being adapted to contain a column of absorbent solution therein;
a separation chamber adapted to receive and separate a mixture of vapor and concentrated absorbent solution from said generator, said separation chamber being disposed below the level of absorbent solution in said analyzer, said separation chamber including a top portion having a plurality of apertures formed therein to provide a restricted passage for passing and distributing vapor in a predetermined pattern from said separation chamber through the column of solution in said analyzer, an aperture formed in a lower region of said separation chamber to provide recirculation of absorbent solution through said generator; and
a rectifier for condensing absorbent from vapor passed thereto from said analyzer, said rectifier being disposed at least partially below the level of absorbent solution in said analyzer, and a rectifier condensate passage connecting said rectifier at a point below the level of absorbent solution in said analyzer and extending upwardly through said separation chamber and said analyzer and terminating at a point above the level of solution in said analyzer for discharging condensate therein, an aperture formed in the wall of said rectifier condensate passage adjacent a portion of said separation chamber containing vapor for passing vapor under pressure from said separation chamber into said rectifier condensate passage to facilitate the passage of condensate from said rectifier section to the top of the level of solution in said analyzer.

References Cited by the Examiner

UNITED STATES PATENTS

| | | | |
|---|---|---|---|
| 2,552,071 | 5/1951 | Terrill | 62—142 |
| 3,138,938 | 6/1964 | Beardslee | 62—141 |

ROBERT A. O'LEARY, *Primary Examiner.*

C. R. REMKE, *Assistant Examiner.*